J. GOOD.
SPINNING MACHINE.
APPLICATION FILED SEPT. 13, 1910.

1,194,834.

Patented Aug. 15, 1916.
6 SHEETS—SHEET 3.

Witnesses:
Fr. Videri
H. L. Kimball

John Good  Inventor
By h. Attorneys

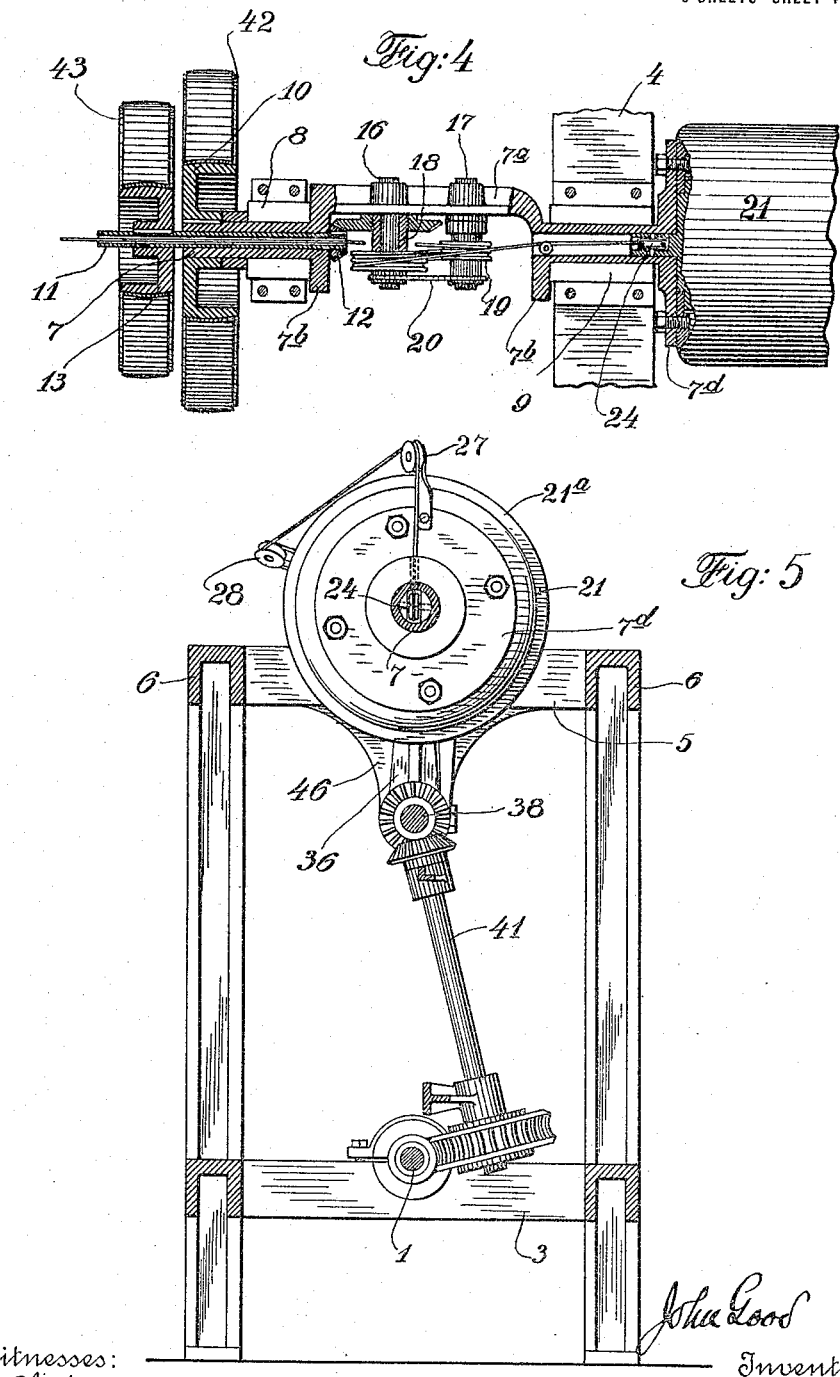

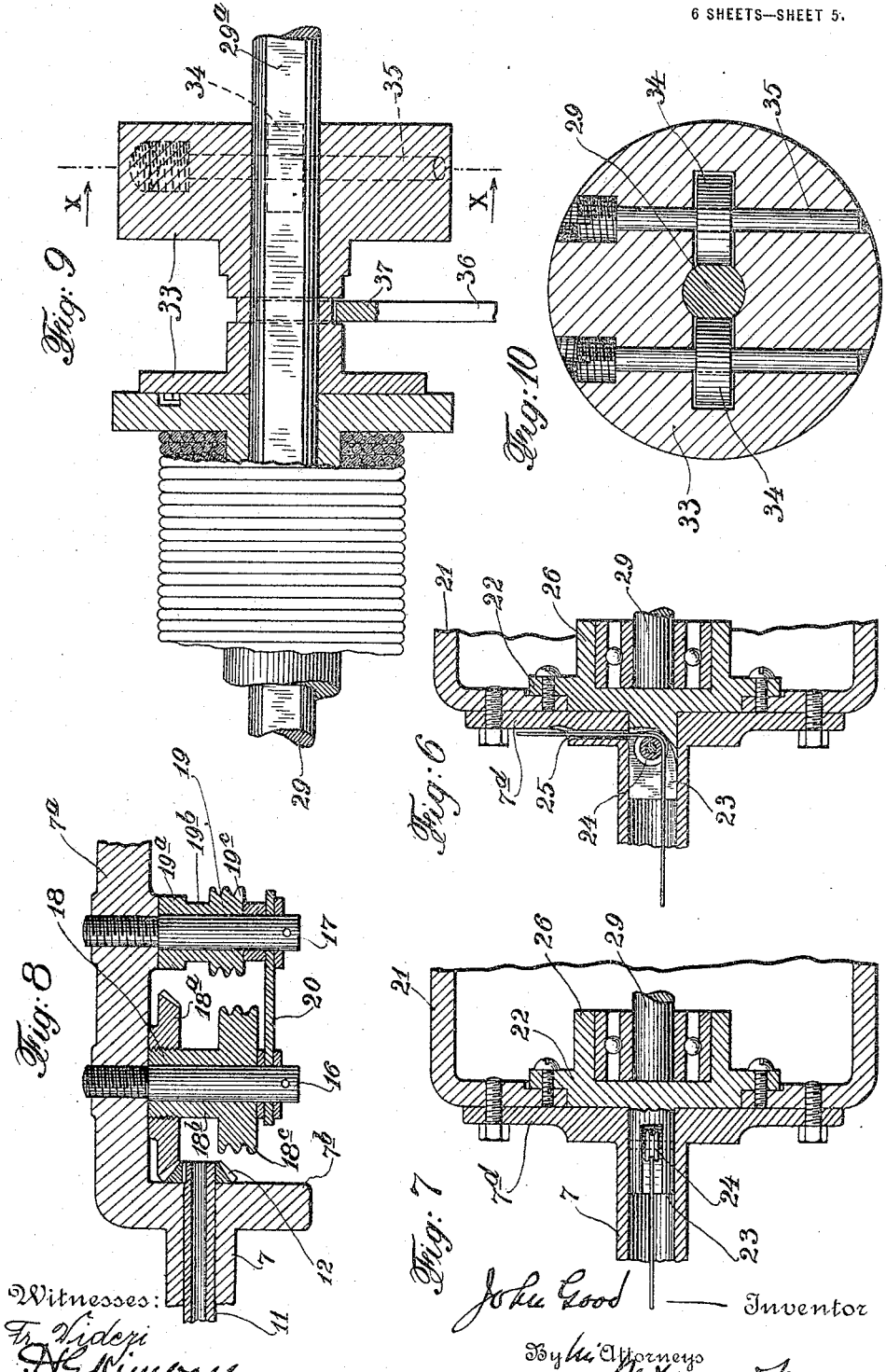

J. GOOD.
SPINNING MACHINE.
APPLICATION FILED SEPT. 13, 1910.
1,194,834.
Patented Aug. 15, 1916.
6 SHEETS—SHEET 6.
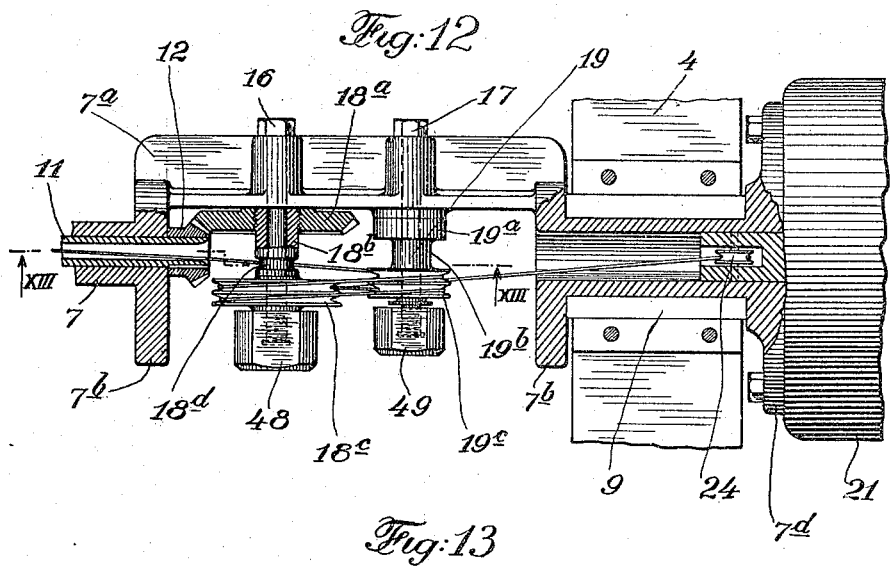
Fig. 12
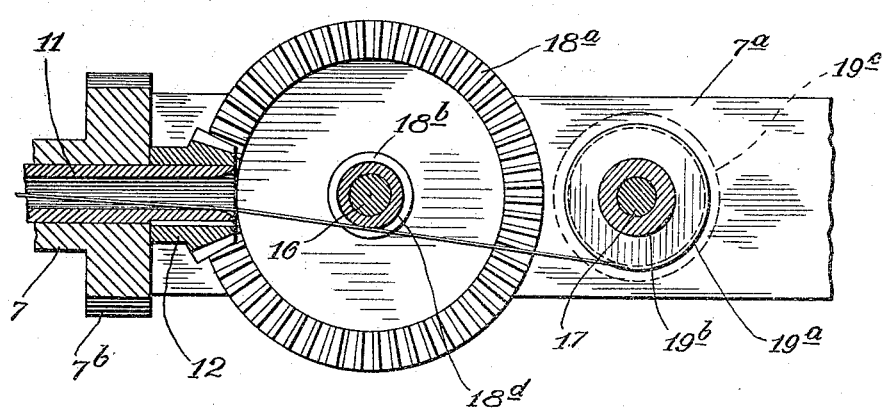
Fig. 13
Fig. 14
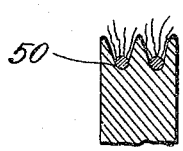
Fig. 14ᵃ
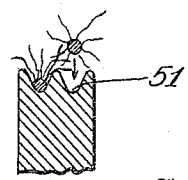
Witnesses:
John Good — Inventor

UNITED STATES PATENT OFFICE.

JOHN GOOD, OF NEW YORK, N. Y., ASSIGNOR TO GOOD INVENTIONS CO., OF BROOKLYN, NEW YORK, A CORPORATION OF NEW YORK.

SPINNING-MACHINE.

1,194,834.   Specification of Letters Patent.   Patented Aug. 15, 1916.

Application filed September 13, 1910.   Serial No. 581,748.

*To all whom it may concern:*

Be it known that I, JOHN GOOD, a citizen of the United States, residing in the borough of Brooklyn, county of Kings, city and State of New York, have invented certain new and useful Improvements in Spinning-Machines, of which the following is a full and true specification, as required by statute.

The object of the invention is to increase the rate of production and improve the general efficiency of spinning or twisting machines, and in particular to improve the construction and mode of operation and the efficiency of machines known as cordage spinners.

To this end the invention provides an organization of elements adapted for higher speeds than practicable with existing machines, and arranged to accomplish and maintain such speeds with a minimum amount of negative work and the least wear on the moving parts.

The invention seeks also to provide special facilities for piecing broken ends, and for threading up the machine and also for removing and replacing the bobbins and it also seeks to reduce the risk of accident to the operator from contact with the machine, as will hereinafter more fully appear.

Figure 1:
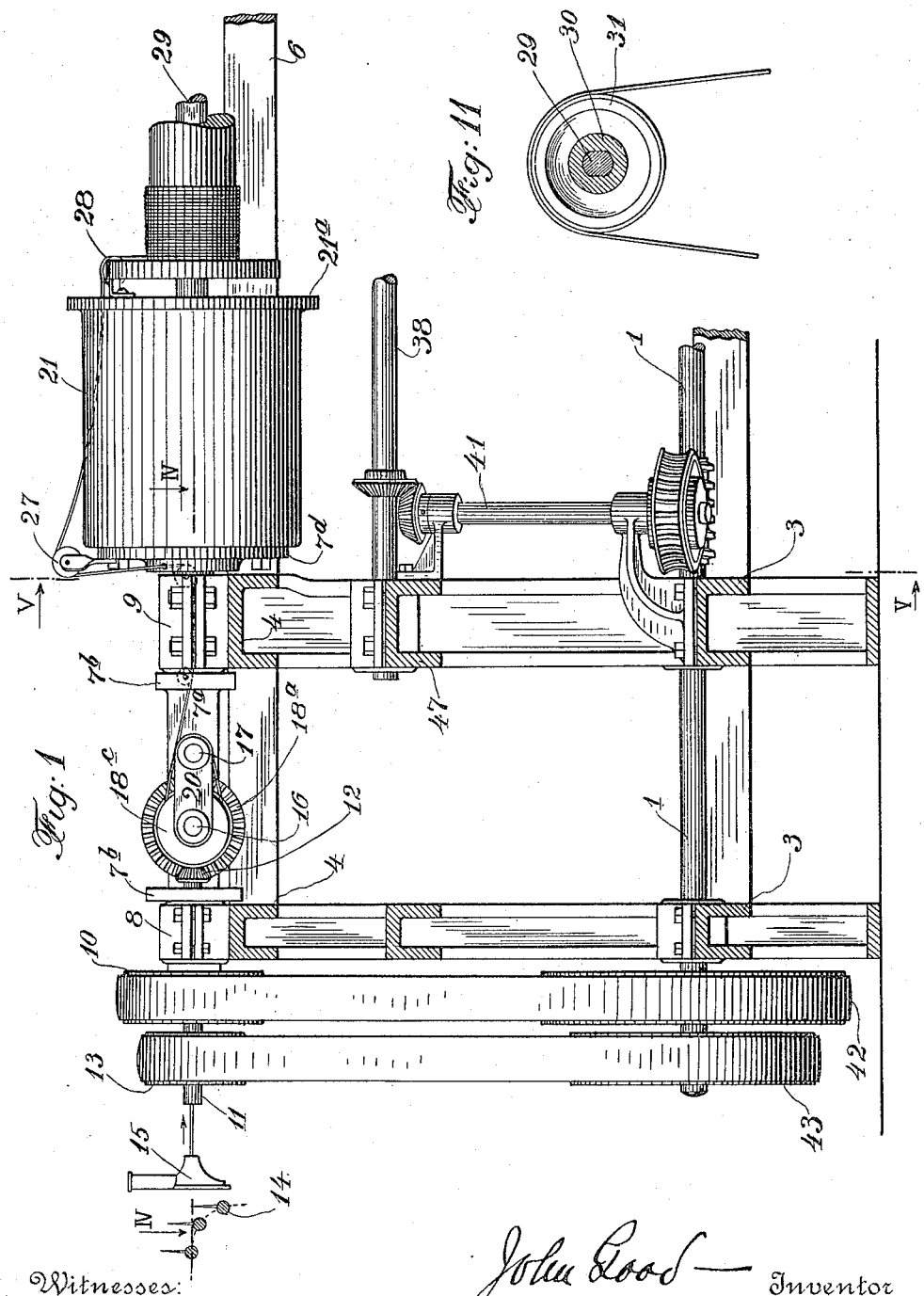
Figure 2:
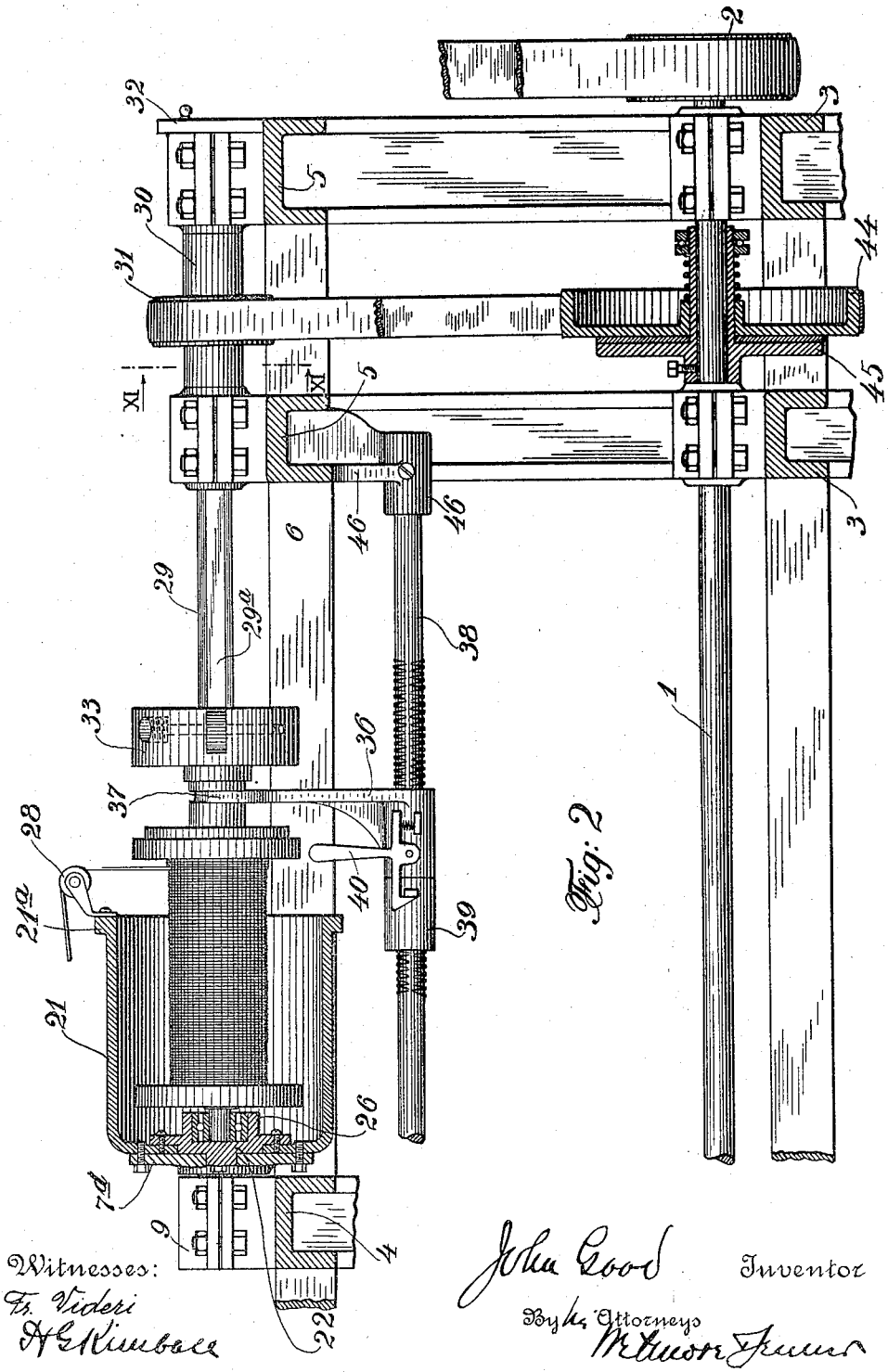
Figure 3:
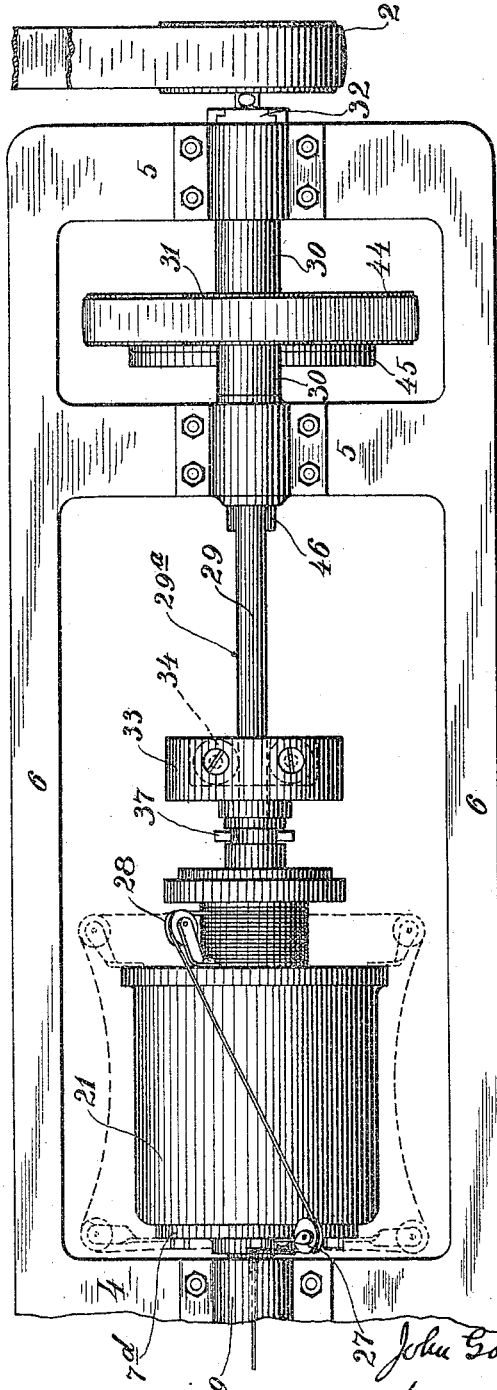

In the drawings which form part hereof, Figure 1 is a side elevation with parts in section of the flier end of a cordage spinner which I have taken for illustration of the principles of the invention; Fig. 2 is a similar elevation of the same machine showing the end which includes the bobbin supporting and tension producing elements, parts being in section as before; Fig. 3 is a top plan of Fig. 2; Fig. 4 a horizontal central section of the flier-spindle and adjacent parts taken on line IV—IV of Fig. 1; Fig. 5 a transverse section of the machine on line V—V of Fig. 1; Fig. 6 an enlarged central section detail of the joint between the flier and spindle; Fig. 7 a similar view in a plane at right angles to that of Fig. 6 showing parts in elevation; Fig. 8 an enlarged detail of the hauling off mechanism; Fig. 9 a similar detail in central longitudinal section of the bobbin holder; Fig. 10 a section on line X—X of Fig. 9; Fig. 11 (on sheet one) a section on line XI—XI of Fig. 2; Figs. 12 and 13 section views of a developed detail; Figs. 14 and 14ª further details.

In the machine illustrated in the foregoing drawings the flier and bobbin revolve on a horizontal axis as in the familiar cordage spinner, and the yarn or sliver to be spun or twisted is intended to be supplied from a chain-conveyer as usual in such machines. The features of the machine which are pointed out in the claims as constituting the present invention, however, are not limited to this arrangement and can be used equally well with the flier axis vertically disposed and with any suitable means for supplying the fiber. The said features, moreover, are not confined to operation upon fiber of any particular length, size or variety, and they can be duplicated in the same machine and they can also be incorporated with fiber preparing or drawing mechanism, as will be obvious to those skilled in this art. In the horizontal spinner shown in the drawings, the primary drive-shaft 1 with its driving pulley 2 is journaled on the lower cross-beams 3 of the machine frame. The upper cross-beams of the frame, two in number and marked 4, provide the supports for the journal-seats of the flier mechanism; the two upper cross-beams, at the opposite end of the frame, and marked 5, support the journals for the bobbin spindle and tension apparatus which will be later explained, while the upper and lower longitudinal beams, marked 6, complete the framework. The primary shaft is provided with pulleys or gearing, later explained, whereby the several revolving parts are operated. The flier-spindle 7 shown more clearly in Fig. 4 is a tubular casting or forging preferably formed in one piece as shown, though it can be made otherwise if desired. One side of this hollow spindle, intermediate of its ends, is open or cut away to form a lateral opening in the spindle leaving a single, lateral, connecting limb which is marked 7ª, to connect the two tubular ends of the spindle so that they will rotate together as one piece. This limb 7ª is disposed all on one side of the spindle axis, and sufficiently distant therefrom to form a proper support for the hauling-off mechanism and on the opposite side of the spindle axis, the spindle is provided with projections 7ᵇ to counterbalance the weight of the limb 7ª and provide an even balance to the spindle, which will thus adapt it to run at high speeds without vibration. Preferably both tubular ends of the spindle form the journals thereof, these being contained respectively in the journal-boxes 8 and 9. The journal which occupies the box 8 is extended through and beyond the same to receive the pulley 10 which is fast thereon and serves to drive the spindle, being belted to the drive shaft 1 for this purpose. A tube 11 is fitted to rotate within this end of the spindle, extending therein from the hauling-off mechanism at one end, where it carries a small bevel pinion 12 fast thereon, to its drive pulley 13 at the other end, adjacent to the flier-drive pulley 10, and also belted to drive shaft 1. This tube 11, which is herein termed the yarn tube, is the means which controls or effects the operation of the hauling-off mechanism for which purpose it is driven at a slightly slower speed than the spindle. It also forms the channel or conduit through which the yarn or sliver passes, from the chain 14 and nipper 15 to the hauling-off mechanism, while it is receiving its twist as will be readily understood.

The construction of the hauling-off mechanism involves a pair of stud shafts 16 and 17 rigidly set by their adjacent ends, in the limb 7ª at right angles to and substantially intersecting the axis of the flier-spindle, both of them being so proportioned as to length and diameter that when in position on the limb with their appurtenances they will not disturb the balance of the spindle, heretofore referred to. The main capstan member 18 is mounted to rotate on the stud 16 and is comprised of a bevel-gear 18ª formed with a tubular boss 18ᵇ thereon which terminates in a grooved yarn-drum 18ᶜ at its free end. The gear 18ª meshes with the yarn tube pinion 12 and the disposition of the mass of the component parts of the capstan member is predetermined with respect to the flier axis, so that the yarn-drum end will substantially counterbalance the gear end when the spindle is in rotation and the effect of centrifugal action on the rotating and revolving capstan will thus be practically eliminated. It may be here pointed out that one of the limitations to the speed and hence to the rate of production of existing cordage spinners, as I have ascertained, is due to the effect of centrifugal action upon the revolving yarn drums and the epicyclic gearing which constitute the hauling-off mechanism of such machines. These drums and gears, as is well known, are usually disposed in the same transverse plane with the yarn tube pinion, meshing therewith, and being of considerable mass, exert a very severe lateral pressure upon their journals, when the flier is in rotation. At the lower speeds of say less than 1500 or 1600 revolutions per minute, the centrifugal pressure is counteracted, or at least partially offset by the tension of the yarn which is trained over them and acts in the opposite direction, so that the resulting frictional load and wear is not prohibitive, with proper lubrication and attention, but at higher speeds the tension of the yarn is utterly inadequate to resist the centrifugal pressure and the friction and wear on the rotary and revolving mechanism thereupon begins to assume highly objectionable proportions, which, in practice, have prescribed 1600 revolutions per minute as about the maximum practicable speed for cordage spinners. The self-balanced capstan 18 of the present invention eliminates the speed limitation just referred to by virtue of the symmetrical disposition of its mass whereby the pressure it exerts on its supporting parts remains practically at a constant minimum regardless of the flier speed. In the present instance the capstan gear 18ª is secured to its tubular stem 18ᵇ by screwthreads, this being a convenient means of construction, but the capstan can be made in any suitable way so long as the yarn drum 18ᶜ and the gear form together a structural unit. The other stud shaft 17, on the spindle limb 7ª, carries an auxiliary capstan 19 which is also formed as a structural unit, but as this capstan is not required to be driven, except by the yarn trained over it, the grooved yarn-drum 19ᶜ at its free end is counterbalanced merely by an enlargement 19ª formed on its tubular stem 19ᵇ, on the opposite side of the spindle axis, so that the support of this auxiliary capstan is also free from the pressure of centrifugal force, and independent of the flier speed. The two capstans as thus formed and mounted are, in the form shown in Figs. 1 to 8, braced from each other by a rigid strut member 20 fitted to the projecting ends of their respective studs and keyed in place as shown, so that it maintains the capstans against distortion from the tension of the yarn thereon or other causes. The yarn coming from the yarn tube 11 is led straight from the bore of the latter and its pinion 12 directly to the auxiliary capstan drum 19ᶜ and is trained one or more times over both of the capstan drums as shown in Figs. 1 and 4 and thence goes to the small button pulley at the entrance to the other journal of the flier spindle. The grooves on the yarn drum of the auxiliary capstan are slightly offset with respect to those on the other yarn drum, the said capstan as a whole being somewhat shorter than the other, so that the yarn makes no sharp turn in passing from the nipper and through the mechanism of the spindle, as it does in the case of the familiar cordage spinner, and the wear that ordinarily occurs on the end of the yarn tube pinion in such machines, is thereby entirely eliminated, while the corresponding strain on the yarn fiber is avoided. It is to be particularly noted that while the strut brace 20 serves to confine the two capstans on their studs, it does not in any way obstruct their free ends in respect of the threading or placing of the yarn thereupon, and that the hauling-off mechanism as a whole is thus entirely accessible to the operative for rapid threading-up of the machine.

The tubular end of the flier spindle that runs in the journal-box 9 terminates in an enlarged disk-shape flange or head 7$^d$ on which the flier proper is mounted, being formed thereon or secured thereto in axial alinement with the spindle axis. The flier is desirably an open-end flier since it need then be no longer than the length of the bobbin traversed into it, and hence is more suitable for safe operation at high speed. The present invention prefers a can flier such as has hitherto been used or suggested for cordage spinners. So far as I am aware, however, these have never been used in connection with spindle and hauling-off mechanisms adapted for the high speeds attained through my invention and their special value has thus not been utilized for it is obvious that the application of a can flier in itself adapted for high speeds, to a machine otherwise incapable of a speed exceeding say 1500 or 1600 revolutions per minute would be entirely ineffective to increase the rate of production or output, and for this reason I regard the combination of the can flier with the counterpoised hauling-off mechanism I have above described, as constituting a special and salient feature of my invention. The useful result thereof is the attainment of a speed and rate of production of spun yarn double the present maximum rates, conducted both with safety and economy of power. The can flier is merely a metallic can as shown at 21 having a circular cross-section and made as thin as practicable, with its forward end preferably provided with a reinforcing flange or bead-rim 21$^a$. I prefer to make the can out of aluminum or an aluminum alloy and as thin as consistent with the strength of such material, considering the speed at which it must run. Sheet steel spun or stamped into the desired shape would also be suitable but in either case the mass of metal in the can should be evenly distributed around its axis, in order to preserve a smooth running balance. In the drawings the thickness of the can appears somewhat exaggerated. The base of the can is formed as an annular flange by which it is bolted to the spindle, as shown more clearly in Figs. 6 and 7. When thus in place the end of the bore through the spindle is closed by a cover-plate 22 fitted to the can and spindle so as to reinforce and strengthen the joint between them. A cylindrical extension or plug 23 on the spindle side of the cover 22 fits within the spindle bore, and carries a yarn-guide pulley 24 and its axle, journaled in a groove or slot therein, so that it is removable with the cover plate and plug. The opposite side of the plug or cover plate is formed with an annular boss 26 which forms a terminal bearing for the end of the bobbin spindle. In the present instance the bobbin spindle 29 rests removably in the interior ring of a well known form of ball-bearing raceway held by the annular boss. The yarn leaving the hauling-off mechanism and passing first over the guide pulley at the entrance to the journal bearing, is thence led over the guide pulley 24 in the plug 23 and thence passes laterally through the yarn outlet 25 formed in the head-flange 7$^d$. The concaved or slanting slot of the plug 23 serves to direct the end of the yarn around the pulley when threading up.

From the outlet opening 25 just referred to, the yarn is led over the outside of the flier can, being trained first over the guide pulley 27 at the rear of the can and then over another guide pulley 28 at the front edge, and passes thence around the free forward edge of the can, inwardly to the bobbin. The unobstructed exposure of the hauling-off capstans between the spindle bearings, as above explained, and this exterior location of the yarn and yarn-guiding means on the outside of the flier can, both contribute to the facility of threading up, since the end of the yarn has only to be passed through the journals 8 and 9, and then laid over the guides on the can, which is a manifestly simple operation. The position of the yarn on or over the outside of the can moreover has the special advantage that it enables the operator to observe the condition or degree of tension thereof, while the flier is revolving at the high speed above referred to.

The rear guide pulley 27 and the forward pulley 28 are mounted in different radial planes with respect to the flier axis so that the yarn is conducted obliquely over or along the flier as clearly shown in Figs. 3 and 5. This disposition of the yarn or its guiding-means constitutes a further important feature of the present invention which is quite independent of the construction of the flier itself or the rest of the mechanism, as hereinafter pointed out in the claims. The position of the yarn, askew to the flier axis, is particularly effective in high speed machines, inasmuch as it eliminates all the objections hitherto encountered from excessive ballooning of the yarn at high speeds, and permits the side-beams (6) of the machine frame to be spaced correspondingly close together, and closer to the flier, than would otherwise be the case with machines running at high speeds and with the yarn not confined within a special tube or conductor. When the flier with the obliquely disposed yarn is in operation the appearance is that of a reversed balloon, as indicated by the dotted lines in Fig. 3; the yarn, considered as a generatrix, describes a so-called ruled or hyperboloid surface, the curvature of which varies somewhat with the tension on the yarn, but is ordinarily concaved, and if convexed under some abnormal conditions of tension and speed is only but slightly so. At speeds of about 3000 revolutions per minute the curvature is ordinarily concaved.

The bobbin spindle 29 with its rearward end removably supported and journaled in the terminal bearing 26 above described, is mounted at its other end in the sleeve 30 of the tension pulley 31, which sleeve occupies the entire space between the journal boxes on the two cross frame beams 5. As hitherto formed the bobbin spindle has been provided with a spline groove engaging a corresponding spline in the tension pulley sleeve so that it can be moved endwise through the same, when removing and replacing the bobbin, and the bobbin holder has carried a spline, also fitting the groove, so that it will impart its rotation to the spindle and at the same time be capable of its traverse motion, back and forth thereon. According to the present invention, however, the bobbin spindle is formed without such groove, the object being to render it more cleanly and less likely to cut the operator's hand when grasped and while still in motion as is likely to be the case when removing a full bobbin. Instead of the usual groove I form the bobbin spindle as a cylindrical shaft with flat faces 29ª milled on its opposite sides so that the cross section has the shape of a non-reëntrant polygon, two of the sides of which are arcs of a circle, while the other two are straight lines or chords. The flat feathers thus formed are the equivalent of a spline groove, in so far as the functions of transmitting rotary and permitting lengthwise movement are concerned, but the objections above noted are removed, since the corners of the spindle are so obtuse as to be incapable of injuring the hand. The tension pulley sleeve fits the flat feathers of the spindle (Fig. 11) so that it is rotated thereby, while the spindle can be moved longitudinally therein when necessary. The bobbin spindle is held against such movement and with its end seated in the bearing of the boss 26, above described, by means of the usual gate-latch 32 which is common in cordage spinners, usually forming part of the stop-motion. The bobbin holder 33 is provided with flat-faced rollers 34 to engage and ride upon the flat feathers 29ª as plainly shown in Fig. 10. These rollers are journaled on pins 35 as indicated, and enable the traverse movement to take place with less friction on the bobbin spindle than is possible with a spline-grooved spindle. The bobbin holder is traversed on the spindle by means which do not form part of the present invention and which are shown in the drawing as comprising a traversing carriage 36 having a fork 37 which engages a fork groove in the bobbin holder. The carriage rides on the traverse screw shaft 38 which is a double-threaded shaft journaled in the depending frame bracket 46 and the cross-beam 47, and suitably held against longitudinal movement therein. The traverse nut 39 fitted to the double-pitched threads of the shaft 38 bears a lateral lug adapted to be removably engaged by a hand latch 40 on the traverse carriage in the obvious way, so that when the traverse screw is revolved, which is effected through the worm and bevel gearing 41, the nut will be traversed back and forth thereon carrying the traversing carriage with it, but allowing the latter to be separated from the nut by releasing the latch.

In the operation of the mechanism above described the flier spindle 7 is driven by the pulley 42 and the yarn tube by the pulley 43, both of these pulleys being fast on the primary drive-shaft 1, but having different speed ratios with respect to pulleys 11 and 13 so that the yarn tube and its pinion 12 will rotate in the same direction but somewhat more slowly than the flier spindle, the differential movement being transmitted to the capstan gear which provides the desired rate of hauling-off movement to the yarn, as will be well understood by those familiar with this art. The rotation thus imparted to the flier and the flier-can is transmitted through the yarn to the bobbin, which is interlocked in the usual way with the bobbin holder, so that the bobbin spindle and the tension sleeve of pulley 31 are likewise rotated. The latter pulley is belted to an idle friction pulley 44 on the primary drive-shaft with a gearing ratio which drives it at a slightly higher rate than the primary shaft. The relative movement between this friction pulley and the shaft is resisted by the friction of the pulley against a friction disk 45 that is fast on the primary shaft and rotates therewith. The friction pulley 44 is held against the friction disk 45 by a spring and adjustable nut whereby a greater or less resistance to the rotation of the bobbin spindle can be thus produced, to vary as desired the tension upon the yarn as it travels over the flier can to the bobbin and is wound thereon. This method of producing tension for the bobbin is well known in the art and forms no part of this invention; any other suitable tension means can be used in conjunction with the features of this invention with like effect.

In Figs. 12 and 13 I have shown the hauling-off mechanism above described in larger scale and slightly modified as to certain details of its construction. In this form the journals of the spinner are somewhat larger than in the form above described and the yarn passages through them are also larger, so that threading up is thereby further simplified and the yarn can run straight without bearing or wearing on the spindle. In leaving the yarn-tube 11 it goes practically straight to the smaller yarn-driven capstan drum 19$^c$, passing through the annular recess between the larger drum 18$^c$ and its driving gear 18$^a$. Additional clearance is formed for the yarn in the present instance by grooving the stem 18$^b$ of the main capstan as shown at 18$^d$. From the larger capstan drum the yarn passes straight to the guide-pulley 24 at the far end of the journal box 9, without intervening support, the bore through the spindle being ample to accommodate the angle of the yarn from the capstan drum as thus arranged. In the present instance the yarn is wound twice jointly around each capstan drum, the latter being provided each with two yarn grooves, but it will be understood that a larger number of such grooves can be used if desired. Counterweights 48 and 49, for the purpose of providing balance, are threaded to the ends of the studs 16 and 17 taking the place of the strut member 20 of the preceding figures.

It is to be noted that the straight away lead of the yarn is provided by the provision of the annular space in the main capstan between its gear and yarn drum, and further by the provision of the groove 18$^d$, though such groove is not needed unless the diameter of the smaller yarn drum be relatively small; and it will be further noted that with a suitable balance of the rotating capstan obtained as above explained, the gear ratio between it and the yarn-tube pinion may be as high as desired with a resulting saving in the wear on the gearing which may be used to impart motion to the latter.

In Fig. 14 I exhibit in detail a further improvement in the hauling-off mechanism which consists in making the grooves in the yarn-drums much deeper than they have been made before, the object being to prevent the free fiber ends or whiskers projecting from the yarn from being overlapped and caught by the yarn entering the adjacent groove. The usual depth of yarn drum or capstan groove is illustrated at 51 in Fig. 14$^a$ wherein it will be seen that the free fiber ends of the yarn in one groove project over the adjacent groove where the yarn being wound thereon will close against and clamp them to the drum. The result of this is that when the section of yarn to which these fibers belong leaves its groove it is torn away from the clamped fibers, which has an objectionable tendency to increase the hairiness of the yarn besides imposing additional load upon the machine and making waste. The groove 50 in Fig. 14 is so deep that the free fiber ends are projected outwardly in the plane of the groove and hence cannot be caught by the yarn entering the adjacent groove, and even if the fibers are corrugated or curled so that they do not project straightly outward, they cannot become clamped by the adjacent yarn because the distance from the bottom of one groove to the bottom of the next is greater than the length of the fiber end. For the size of yarn customarily used in making rope the groove need not be greater than that shown in Fig. 14, the test of a proper depth being the resulting position of the fibers, as will be readily understood from what has been said, without giving the exact limits of dimensions for different sizes and kinds of yarn.

It will be apparent from the description of my invention above given, that the same is not limited to size, shape, or proportions or the details of construction in which it is embodied and that various changes, modifications and substitutions can be made therein without departing from the principle thereof. It will be further understood that while the flier-can is preferably formed as shown in the drawings, it is not necessary that the same form a complete lateral inclosure to the bobbin within it, but that portions of the side wall of the can may be cut out for the sake of lightness if desired, provided the balance of the can is not affected thereby and also that the strength of the metal remaining be sufficient to withstand the centrifugal tension thereon. The flier-can, however, will preferably possess a continuous circular cross-section at or near its free edge, whether its lateral portions be removed or not.

I claim as my invention the following:

1. In a cordage or long-line spinner, the combination of a suitably journaled, balanced flier spindle provided with a metallic can flier and a balanced hauling-off mechanism, comprising a capstan device transversely journaled on the said spindle with equal portions of its mass disposed on opposite sides of the spindle axis, whereby said can flier can be operated to spin cordage yarns at high speeds.

2. In a cordage or long-line spinner, the combination of a flier spindle provided with a metallic can flier secured to one end thereof and a balanced hauling-off mechanism comprising main and auxiliary capstan devices both journaled on transverse axes on said spindle, intersecting the axis of the latter and each having substantially equal portions of its mass balanced on opposite sides of said spindle axis.

3. In a cordage or long-line spinner, the combination of a flier spindle, spaced spindle journals therefor, a can flier on the end of the spindle provided with means for guiding the yarn in a predetermined path thereon, and hauling-off mechanism for the yarn comprising one or more transversely journaled capstan devices mounted on the spindle between the journals thereof and each having substantially equal portions of its mass disposed on diametrically opposite sides of the spindle axis.

4. In a cordage or long-line spinner, the combination of a flier spindle, spaced spindle journals therefor, a can flier on one end of the spindle having yarn-guiding rollers thereon, an independently driven yarn tube within the journal portion of the spindle remote from the can flier, and hauling-off mechanism geared to the yarn tube and comprising one or more transversely journaled capstan devices mounted on the spindle between the journals thereof and each having substantially equal portions of its mass balanced on opposite sides of the spindle axis.

5. In a cordage spinner, the combination with a flier spindle, of a flier consisting of an open-end can, and yarn guides on the outside of the can arranged to conduct the yarn over but out of rubbing contact with the exterior surface of the can.

6. In a cordage spinner, a flier spindle bearing a can flier at its end and said flier having means for conducting a clear stretch of the yarn obliquely toward its rim or edge and thence inwardly to the bobbin, in combination with a hauling-off capstan member mounted on and rotating with the spindle with substantially equal portions of its mass balanced on opposite sides of the spindle axis, a journal seat for the spindle between the can and such mechanism and a passage through the spindle and journal-seat to the said yarn conducting means.

7. In a spinning or twisting machine, a flier provided with means for guiding the yarn thereon in a straight stretch disposed obliquely to the axis of rotation thereof.

8. In a spinning or twisting machine, a flier consisting of an open-end can provided with means for guiding the yarn in a clear stretch outside of the can and obliquely to its axis.

9. In a spinning or twisting machine, a flier spindle having a journal through which the yarn passes, and provided with a lateral outlet for the latter, an open-end flier on the spindle and yarn-guiding means conducting the yarn from the outlet along the flier in an oblique direction to the axis thereof and out of contact with the flier body, and thence to the bobbin.

10. In a spinning or twisting machine, a tubular flier spindle, hauling-off mechanism carried thereon comprising main and auxiliary capstans both mounted on axes intersecting the axis of the spindle and being unobstructed at their free ends to receive the yarn thereon.

11. In a spinning or twisting machine, a flier spindle comprising tubular journals and a connecting counterpoised limb between such journals disposed all on one side of the spindle axis, in combination with a rotary capstan journaled on said limb on an axis transverse to the spindle axis and having one end free and unobstructed to receive yarn thereover.

12. In a spinning or twisting machine, a flier spindle comprising tubular end portions and a limb connecting the tubular ends and disposed on one side of the spindle axis, two capstan-supporting stud shafts mounted on said limb intersecting the spindle axis and capstan journaled on each stud.

13. In a spinning or twisting machine, a flier spindle comprising tubular journals joined by a counterpoised connecting limb disposed all on one side of the spindle axis, and providing a laterally open space, intersected by said axis, in combination with capstan members transversely journaled in said space and having the mass thereof arranged in substantially equal amounts on opposite sides of said axis.

14. In a spinning or twisting machine, a spindle having tubular journal portions and an intermediate laterally-open portion, bearings for said journal portions, means connected with one of the tubular portions of the spindle for driving the same, a flier secured to the other tubular portion of the spindle, a pinion rotatable independently of the spindle in the laterally-open portion thereof, and a capstan geared to said pinion and revolving on an axis transverse to the axis of the spindle, the free end of said capstan being unobstructed to receive the yarn upon it.

15. In a spinning or twisting machine, a spindle having tubular journal portions and an intermediate laterally-open portion, bearings for said journal portions, means connected with one of the tubular portions of the spindle for driving the same, a can flier on the other tubular portion of the spindle, a yarn tube extending through the tubular portion of the spindle bearing the spindle-driving means, independent driving means connected with the outer end of said yarn tube, and a capstan transversely disposed in the laterally-open portion of the spindle and geared to said tube.

16. In a spinning or twisting machine, a tubular flier spindle containing a yarn tube within one of its bearings and bearing a transversely disposed capstan geared to the yarn tube, said capstan comprising a yarn drum and gear, each of substantially equal mass and disposed respectively on opposite sides of the axis of the spindle.

17. In a spinning or twisting machine, a tubular flier spindle, a gear driven capstan thereon and a yarn driven capstan also thereon consisting of a drum and counterweight each being of substantially equal weight, and disposed on opposite sides respectively of the axis of the spindle.

18. In a spinning or twisting machine, a tubular flier spindle laterally open on all of one side of its axis, hauling-off mechanism carried in the open space thereof comprising main and auxiliary capstans each formed as structural units and both mounted on axes substantially intersecting the axis of the flier and having substantially equal portions of their mass disposed on opposite sides of the spindle axis, and being unobstructed at their adjacent ends to receive the yarn thereover.

19. In a spinning or twisting machine, a tubular flier spindle, laterally open between its ends, a stud mounted transversely to the axis of the spindle on the limb connecting the tubular ends thereof, a capstan on the stud and a yarn tube within the spindle geared to the capstan.

20. In a spinning or twisting machine, a tubular flier spindle, a flier can on the end of the spindle, a plug inserted through the can into the bore of the spindle and a yarn guide pulley carried by the plug within the spindle and a yarn outlet in the spindle outside of the can.

21. In a spinning machine, the combination with the bobbin spindle having the cross-sectional shape of a non-reëntrant polygon, and a tension sleeve fitting the spindle and through which the spindle is longitudinally movable, of a bobbin holder also fitting the spindle, and means for traversing the bobbin holder upon the said spindle.

22. In a spinning or twisting machine, a bobbin spindle consisting of a cylindrical shaft having flat faces formed on its opposite sides, a bobbin holder fitting and movable longitudinally upon the spindle and provided with rollers engaging the faces of the spindle to prevent relative rotary movement of the holder thereon, a rotary sleeve also slidingly fitted to the spindle and means for traversing the holder on the spindle.

23. In a spinning or twisting machine a hauling-off mechanism comprising an auxiliary capstan and a main capstan mounted to rotate on an axis transverse to and intersecting the flier axis one of said capstans being provided with an annular space between its ends providing a clearance space for the yarn trained over the auxiliary capstan.

24. In a spinning or twisting machine, a yarn tube and a hauling-off mechanism comprising a main capstan and an auxiliary capstan both mounted to rotate on axes transverse to the flier axis, the main capstan being gear-driven and having an annular clearance space through which the yarn passes from the yarn tube to the auxiliary capstan.

25. In a cordage spinner, hauling-off mechanism comprising a pair of yarn drums each provided with several adjacent yarn grooves, the dividing walls between grooves being relatively high with respect to the thickness of the yarn and adapted to prevent any of the fiber ends or "whiskers" normally projecting from the yarn in one groove from being seized between the yarn and drum in an adjacent groove and torn off.

In testimony whereof I have signed this specification in the presence of two witnesses.

JOHN GOOD.

Witnesses:
CLIFFORD H. KLOS,
H. G. KIMBALL.

Copies of this patent may be obtained for five cents each, by addressing the "Commissioner of Patents, Washington, D. C."